Figure 6:
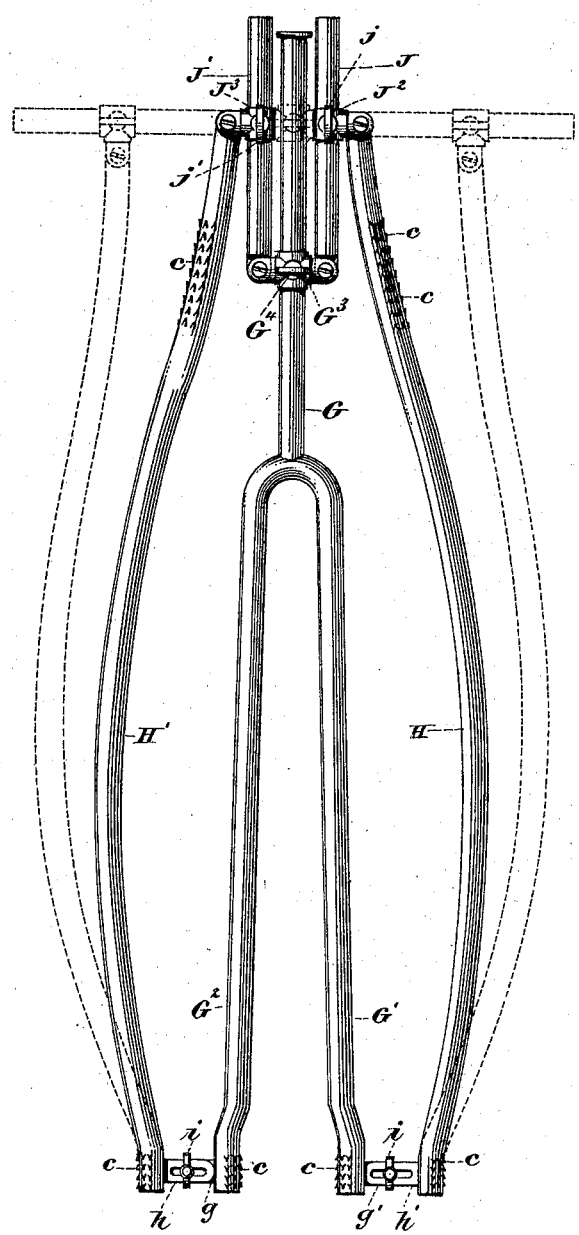

(No Model.) 2 Sheets—Sheet 1.
P. O'THAYNE.
GARMENT DISTENDER AND DRIER.
No. 604,122. Patented May 17, 1898.
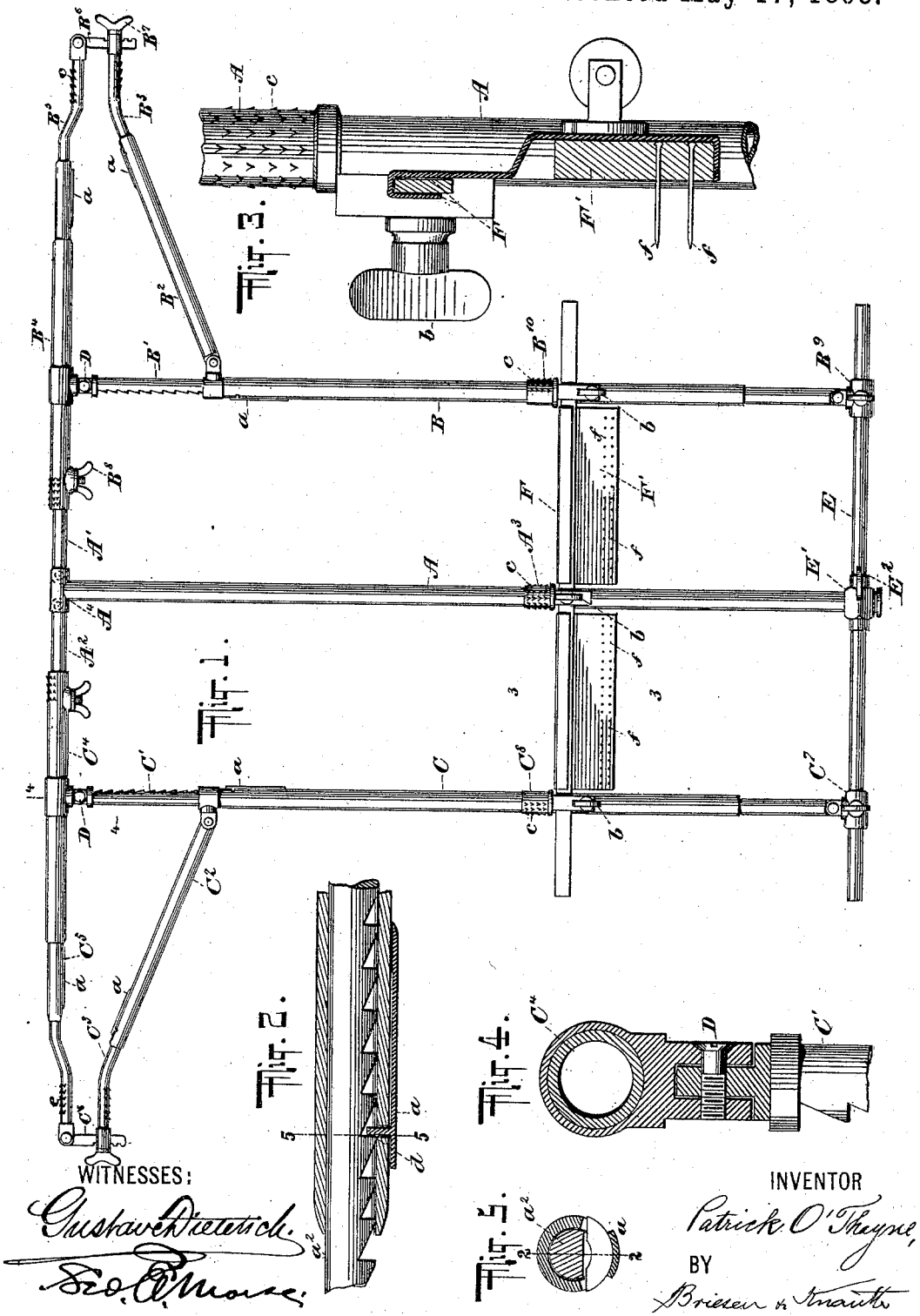
WITNESSES:
INVENTOR
Patrick O'Thayne,
BY
Briesen & Knauth
ATTORNEYS (No Model.) 2 Sheets—Sheet 2.

P. O'THAYNE.
GARMENT DISTENDER AND DRIER.

No. 604,122. Patented May 17, 1898.

WITNESSES: INVENTOR
Patrick O'Thayne,
BY
Briesen & Knauth
ATTORNEYS

UNITED STATES PATENT OFFICE.

PATRICK O'THAYNE, OF NEW YORK, N. Y.

GARMENT DISTENDER AND DRIER.

SPECIFICATION forming part of Letters Patent No. 604,122, dated May 17, 1898.

Application filed March 12, 1897. Serial No. 627,185. (No model.)

*To all whom it may concern:*

Be it known that I, PATRICK O'THAYNE, a resident of the city, county, and State of New York, have invented an Improved Garment Distender and Drier, of which the following is a specification.

My invention relates to drying-frames for drying undergarments and the like after they have been washed, so as to distend the same and hold them distended until dried.

My invention is especially applicable in laundries where shrunken garments are washed, as after the garments have been washed they may be stretched to their original shapes and dimensions on the frames and when dried will retain such original shapes and dimensions.

My invention consists in the construction hereinafter set forth and claimed.

The invention will be understood by referring to the accompanying drawings, forming part thereof, in which—

Figure 1 is an elevation of a frame embodying my invention, the same being designed for use in stretching undershirts. Fig. 2 is an enlarged detail view of the extensible arm-pieces, the same being in section and showing the mode of locking the said arm-pieces. Fig. 3 is an enlarged detail view of the device for holding the lower edge of the garment and for drawing the same downward. Fig. 4 is a section on line 4 4 of Fig. 1. Fig. 5 is a section on line 5 5 of Fig. 2, showing also the line 2 2, on which the section Fig. 2 is taken; and Fig. 6 is a side view of the frame for receiving the drawers, the same being shown in its collapsed position in full lines and in its distended position in dotted lines.

Referring particularly to Figs. 1 to 5, inclusive, A is the center bar of the frame, which is flanked on either side by side bars B C. These bars are preferably hollow, the side bar B receiving a serrated rod $B'$ and the side bar C receiving a serrated rod $C'$. Pivoted to the upper end of the side bar B is an arm-piece $B^2$, which is hollow and receives a serrated rod $B^3$. Pivoted to the top of the serrated bar $B'$ is a tube or cross-bar $B^4$, which is an arm-piece and receives therein a rod $B^5$. This rod $B^5$ is provided with a latch $B^6$, which engages with a set-screw $B^7$ on the rod $B^3$. The tubes $B^2$ and $B^4$, with their adjunctive devices, constitute an expanding arm-distender, whose operation will be hereinafter described. Pivoted to the main bar A is a bar $A'$, which enters the tube or cross-bar $B^4$ and is held therein by the set-screw $B^8$. Pivoted to the upper end of the bar C is a tube $C^2$, which receives a bar $C^3$. Pivoted to the upper end of the rod $C'$ is a tube $C^4$, which receives the bar $C^5$ in one end and the bar $A^2$ in the other end. This bar $A^2$ is pivoted to the upper end of the main bar A in the same manner as the bar $A'$ is. The tubes $C^2$ and $C^4$ and the rods $C^3$ and $C^5$, with their connecting catch $C^6$, constitute another arm-expander. It will be understood that the rods $C^4$ and $B^4$ turn upon the pivots D and that the said arms may be collapsed by drawing downward on the main bar A. This main bar A passes through an eye $E'$ in a cross-bar E and is held therein by a suitable set-screw $E^2$. The side bars B and C are provided at their ends with eyes $C^7 B^9$, through which the cross-bar E passes, so that the side bars will remain fixed in place while the main bar descends. A slide $C^8$ slides upon the side bar C, similar slides $A^3$ and $B^{10}$ sliding upon the bars A and B, respectively. These slides, as clearly shown in Figs. 1 and 3, are connected by a cross-bar F, to which a suitable attaching device $F'$ may be secured, the same being shown in the present instance as provided with a number of points $f$ for entering the lower edge of the garment to hold the same.

In order to accommodate the structure to different lengths and sizes of arms, the tubes which receive the serrated rods are provided with spring-catches $a$. These spring-catches engage teeth $d$ on the tubes, so that the tubes may be drawn outward as far as is necessary, but cannot be returned to their retracted positions because of the fact that the edges of the teeth abut squarely against the latch or catch $a$. In order to shove the serrated rods back into the tubes, it is necessary to turn them completely around, bringing their smooth faces $a^2$ into contact with the catches $a$, when the rods may be readily moved in any desired direction.

In order to put a garment on the frame, the said frame is collapsed by drawing down the rod A, which will have the effect of swinging the tubes $B^4 C^4$ on their pivots D and the rods $A^2 A'$ on the point $A^4$. This brings the arm-distenders toward each other and points the same upward, so that the garment may be readily slipped over in the same manner that a man puts an undershirt on over his head. By shoving upward on the center rod A the frame is restored to its original shape. The skirt of the undershirt may now be pulled downward and the pins $f$ inserted therethrough and the cross-bar F pulled downward as far as desired and clamped in place by the set-screws $b$. The garment may now be dried upon this frame and when dried will retain its shape. Various parts of the structure are provided with points $c$, struck up out of the metal to retain the garment in position.

By my invention I am enabled to collapse the frame for the withdrawal of the shirt without destroying the adjustment of the parts. It will be understood without further explanation that the adjustments of the arm-expanders will not be altered by collapsing the frame, but will be merely collapsed to allow of the withdrawal of the shirt, and that the expansion of the frame will cause them to assume the same position for which they were originally set. In order to collapse the frame and yet retain the bar F in the position to which it has been adjusted, it is merely necessary to loosen the set-screw $b$ at the center bar and force the center bar A down through the sleeve $A^3$. This will result in the side bars B C being moved around the pivots by which they are connected to the eyes or sleeves $C^7$ $B^9$. The bar F, being loose in the brackets connected with the sleeves $C^8$, $A^3$, and $B^{10}$, does not interfere with the slight lateral movement of the side bars when the frame is collapsed or expanded.

In Fig. 6 I have shown another form of my invention having a main bar G, terminating at its lower ends in branches $G'$ $G^2$, which branches are flanked on either side by side bars H H', the said bars terminating at their lower ends in loops or eyes $h$ $h'$ $g$ $g'$, which are held by set-screws $i$. A slide $G^3$ moves freely on the main bar G when desired and is held rigid thereon by a set-screw $G^4$ when desired. Pivoted to the said slide are bars or tubes J J', which are analogous to the tubes $C^4 B^4$ of Figs. 1 to 5. These tubes carry slides $J^2$ $J^3$, which are provided with set-screws $j$ $j'$ and are movable freely on the bars or rods J J'. The upper ends of the side bars H H' are pivoted to the slides $J^2$ $J^3$. In order to put the garment on the frame, the said frame is collapsed into the position shown in full lines in Fig. 6, the garment drawn thereon, and the slide $G^3$ pulled upward until the parts resume the positions shown in the dotted lines, whereupon the garment will be properly stretched.

What I claim, and desire to secure by Letters Patent, is—

1. In an adjustable and collapsible garment-distender, the combination of center and side bars, means for adjustably connecting the said center and side bars at their lower ends, a plurality of cross-bars $B^4$ $C^4$ pivotally and adjustably connected to the center bar and to the upper end of the side bars, and bars $B^2$ $C^2$ pivoted to the side bars and in connection with the last-mentioned cross-bars, whereby the cross-bars $B^4$, $B^2$ and $C^4$ $C^2$ constitute arm-distending devices, substantially as described.

2. In an adjustable and collapsible garment-distender, the combination of a middle main bar and side bars, of collapsible arm-distenders each comprising a plurality of bars, one pivoted to a side bar and the other pivoted both to a side bar and to the main bar, means for adjusting the arm-distenders laterally independently of the expansion of the frame, and adjustable means for retaining the skirt of a garment in place.

3. In a garment-distender, the combination of a pivotally-connected collapsible frame, a cross-bar F adjustable upon the said frame, means carried by the said cross-bar for retaining the lower edge of the garment in place and means whereby the frame may be collapsed without effecting a movement of the cross-bar.

4. In a garment distender and drier, the combination of a plurality of side bars, a movable bar A, adjustable arm-distenders connected to the side bars and to the movable bar A, a pivotal connection intervening between the arm-distenders and the upper end of the movable bar A whereby the said distenders may be collapsed toward their centers, and means for retaining the parts against movement around their pivots.

5. In an adjustable and collapsible garment-distender, the combination of a longitudinally-movable main bar, side bars adjustably connected therewith, longitudinally-adjustable arm-distenders each comprising a plurality of rods, one of the rods of each of said arm-distenders being pivoted to a side bar and another of the rods of each of said arm-distenders being pivoted to a side bar and to the main bar and means for adjusting the arm-distenders laterally independently of the expansion of the frame.

6. In an adjustable and collapsible garment-distender, the combination of a longitudinally-movable main bar and side bars adjustably connected therewith, each of said side bars comprising a plurality of members adjustable with relation to each other, longitudinally-adjustable arm-distenders each comprising a plurality of rods, one of said rods of each of the said arm-distenders being pivoted to one member of a side bar and another of the said rods of each of said arm-distenders being pivoted to a second member of a side bar and to the main bar and means for adjusting the arm-distenders laterally at both ends independently of the expansion of the frame.

PATRICK O'THAYNE.

Witnesses:
  MAURICE BLOCK,
  GEO. E. MORSE.